United States Patent
Sorge et al.

(10) Patent No.: US 9,926,990 B2
(45) Date of Patent: Mar. 27, 2018

(54) OPERATING A DRIVE TRAIN OF A VEHICLE HAVING A CLUTCH ASSEMBLY FOR DISTRIBUTING TORQUE

(71) Applicant: GKN Driveline International GmbH, Lohmar (DE)

(72) Inventors: Kai Sorge, Sankt Augustin (DE); Serkan Öztürk, Rösrath (DE); Erik Resvoll, Unkel (DE)

(73) Assignee: GKN Automotive Limited, Redditch, Worcestershire (GB)

( * ) Notice: Subject to any disclaimer, the term of this patent is extended or adjusted under 35 U.S.C. 154(b) by 0 days.

(21) Appl. No.: 15/340,036

(22) Filed: Nov. 1, 2016

(65) Prior Publication Data
US 2017/0130787 A1    May 11, 2017

(30) Foreign Application Priority Data
Nov. 6, 2015  (DE) .................. 10 2015 119 133

(51) Int. Cl.
*F16D 48/10* (2006.01)
*B60K 17/02* (2006.01)
*B60K 17/348* (2006.01)

(52) U.S. Cl.
CPC .............. *F16D 48/10* (2013.01); *B60K 17/02* (2013.01); *B60K 17/348* (2013.01); *F16D 2500/1021* (2013.01); *F16D 2500/302* (2013.01); *F16D 2500/304* (2013.01); *F16D 2500/7109* (2013.01)

(58) Field of Classification Search
None
See application file for complete search history.

(56) References Cited

U.S. PATENT DOCUMENTS

| | | | | |
|---|---|---|---|---|
| 7,128,688 B2* | 10/2006 | Katou | .................... | F16D 25/10 137/112 |
| 7,686,112 B2* | 3/2010 | Shiiba | .................... | B60K 6/48 180/65.21 |
| 8,065,047 B2* | 11/2011 | Hasegawa | ................ | B60K 6/48 701/22 |
| 2004/0192506 A1* | 9/2004 | Nakamura | ............ | F16H 61/143 477/176 |

FOREIGN PATENT DOCUMENTS

| | | |
|---|---|---|
| DE | 10333655 A1 | 3/2005 |
| DE | 11 2009 001 198 T5 | 4/2011 |
| DE | 10 2015 112 924 A1 | 2/2016 |

* cited by examiner

*Primary Examiner* — Dirk Wright
(74) *Attorney, Agent, or Firm* — Bejin Bieneman PLC (57) ABSTRACT

A method for operating a drive train of a vehicle having a clutch assembly, in particular for distributing torque to a primary axle and a secondary axle of the vehicle and/or for distributing torque between two wheels of one axle of the vehicle, comprises at least the following steps:
a) determining temperature data at least from an electronic control unit which is assigned to the clutch assembly, or from an actuation unit of the clutch assembly;
b) evaluating the temperature data determined in step a); and
c) reducing an effective value of a control current at least of the electronic control unit or of the actuation unit by pulsing the control current if the evaluation in step b) reveals that a temperature at least of the electronic control unit or of the actuation unit exceeds a threshold value.

17 Claims, 4 Drawing Sheets

OPERATING A DRIVE TRAIN OF A VEHICLE HAVING A CLUTCH ASSEMBLY FOR DISTRIBUTING TORQUE

CROSS-REFERENCE TO RELATED APPLICATIONS

This application claims priority to German Application No. DE 10 2015 119 133.4 filed on Nov. 6, 2015, which application is hereby incorporated herein by reference in its entirety.

BACKGROUND

With respect to the control of a clutch assembly, it is known that an electronic control unit (ECU) is assigned thereto. Such an electronic control unit can be integrated into the clutch assembly itself or into a superordinate electronic management system of the vehicle, in particular of the drive train.

To be able to ensure as far as possible optimum vehicle movement dynamics properties of a demand-oriented all-wheel driven vehicle even in boundary situations (e.g., frequent load changes, repeated starting on a gradient, repeated changing between single-axle operation and all-wheel drive etc.), stringent requirements are made of the electronic control unit of the clutch assembly. In particular in the boundary situations described above, strong heating may occur of the power stage and/or of the electronic servomotor, owing to heavy loading. This heating can extend as far as overheating of the electronic control unit. Known electronic control units, power stages and/or electronic servomotors are switched off in these cases, in particular in the case of imminent overheating, in order to avoid continuous damage to the respective component, in particular to the control unit and/or to the electronic servomotor.

However, such overheating prevention measures have the disadvantage that they act directly on the operation or the driving behaviour of the vehicle, and under certain circumstances, cause the demand-oriented all-wheel system to fail for a certain time. This can lead to reductions in the driving comfort and/or in the vehicle movement dynamics which are perceptible to the driver.

SUMMARY

The present disclosure relates to a method for operating a drive train of a vehicle having a clutch assembly, in particular for distributing torque to a primary axle and a secondary axle of the vehicle. For example, the disclosure includes a method for vehicle movement dynamics control in demand-oriented all-wheel systems and/or active axle locks. The disclosure also includes vehicles that are configured to be adapted in this context and in which information is available relating to the current engine torque, the longitudinal acceleration, the lateral acceleration, the yaw rates (denotes the speed of the rotation of a vehicle about the vertical axis), the steering angle and/or the wheel speeds. The disclosure relates, in particular, to all-wheel-driven vehicles in which either the rear axle or the front axle (proportionally and/or temporarily) can be connected by means of an electronically controlled clutch assembly. Alternatively or in addition, the presently disclosed subject matter can also be applied in axle locks, in particular active axle locks, in which one side of an axle can be at least partially decoupled from an opposite side (in the axial direction) of the axle by means of an electronically controlled clutch assembly. As a result, a demand-oriented torque distribution can be performed between two wheels of an axle. The clutch assembly can be an electromechanical clutch system, in particular an electronically controlled multi-disc clutch. An electromechanical clutch system is understood here to be, in particular a clutch system or a clutch assembly in which an electronic servomotor is provided for adjusting the clutch force. In such an electronic servomotor the mechanical coupling usually takes place between the engine rotational angle and the clutch adjustment travel.

In particular, the method for operating a drive train of a vehicle provides an overheating prevention measure which has practically no effect on the driving behaviour of the vehicle. The method is intended to have the effect in particular that even in boundary situations undesired overheating of the electronic control unit (ECU) and/or of the electronic servomotor is avoided without the driver noticing a material decrease in performance.

Beyond the features of claim 1, further advantageous examples of the method are specified in the dependent claims. It is to be noted that the features which are disclosed individually in the dependent claims can be combined with one another in any desired technically appropriate fashion and define further examples. Furthermore, the features which are specified in the claims are specified and explained in more detail in the description, with further examples being presented.

A method for operating a drive train of a vehicle having a clutch assembly, in particular for distributing torque on a primary axle and a secondary axle of the vehicle and/or for distributing torque between two wheels of one axle of the vehicle, comprises at least the following steps:
a) determining temperature data at least from an electronic control unit which is assigned to the clutch assembly, or from an actuation unit of the clutch assembly,
b) evaluating the temperature data determined in step a),
c) reducing an effective value of a control current at least of the electronic control unit or of the actuation unit by pulsing the control current if the evaluation in step b) reveals that a temperature at least of the electronic control unit or of the actuation unit exceeds a threshold value.

The sequence of the method steps indicated above occurs during usual operation of the drive train of the vehicle. The method steps a) to c) can be carried out in a continuously repeating fashion during the operation of the drive train. The method steps a) to c) can, at least at certain times, also be carried out in parallel or repeated.

The actuation unit preferably comprises at least one electronic servomotor. The method proposed here is based, in particular, on the concept of changing or adapting control of the clutch assembly, in particular the control or the control current of the electronic control unit and/or of the actuation unit when a setpoint torque of the clutch assembly can no longer be reached, without overheating the electronic control unit and/or the actuation unit.

The method proposed here can be understood to be an overheating prevention measure of an electronic control unit (ECU) and/or of an actuation unit of a clutch assembly, in particular of a demand-oriented all-wheel system. The method is based, in particular, on reducing the heat generated in the electronic control unit and/or the actuation unit, by pulsation of the current of the control unit or of the actuation unit. A (e.g., temporarily) pulsed, in particular pulse-width-modulated control current or control signal permits, even during an operating phase with high loading (possibly overloading) of the clutch assembly, the required function of the clutch assembly, specifically the transmission of torque, to be maintained, and an emergency shutoff of the control of the clutch assembly to be avoided. As a result, in practice the driver does not perceive the overheating prevention measure. The maximum torque capacity can be maintained virtually completely even during the overload phase. In particular, the continuous availability of a demand-oriented all-wheel system is significantly improved with the method.

According to step a), temperature data is initially determined from the electronic control unit assigned to the clutch assembly and/or from the actuation unit. Temperature data is understood to be parameters and/or data of the vehicle, in particular of the drive train, which permit direct conclusions to be drawn about the temperature actually prevailing at or in the control unit and/or actuation unit. In this context, at least one temperature of the electronic control unit and/or of the actuation unit can be measured (directly). Determining of data according to step a) can be carried out by measuring, simulating and/or calculating the (actual) temperature at and/or in the electronic control unit and/or the actuation unit.

In one example, it is proposed that in step a) a temperature of the electronic control unit and/or of the actuation unit is measured by means of a temperature sensor assigned to the electronic control unit and/or the actuation unit. Said temperature sensor can be in heat-conducting contact with the clutch assembly, in particular with the electronic control unit and/or the actuation unit. According to step b), the temperature data (of the electronic control unit and/or of the actuation unit) which is determined in step a) is evaluated. Algorithms, comparison operations or the like, which are stored in a control program of an electronic memory of an electronic control unit and can be carried out by means of a program-controlled microprocessor of the control unit can be used for the evaluation. Step b) can be carried out in the actual electronic control unit which is to be monitored.

According to step c) an effective value of the control current of the electronic control unit and/or of the actuation unit is reduced by pulsing the control current if the evaluation in step b) reveals that a temperature of the electronic control unit and/or of the actuation unit exceeds a predefined or currently calculated threshold value. In other words, the effective value is to be reduced if overheating or imminent overheating of the clutch assembly, in particular of the control unit and/or of the actuation unit, is recognized or detected.

Pulsation means here, in particular, that the signal of the control current oscillates between an upper value and a lower value. The control current can have here the profile of the type of a square-wave signal, of a triangular signal, of a saw-tooth profile, of a sine wave or the like. In particular, the control current or the control signal is slightly reduced and increased again in a predetermined time interval.

The effective value relates to an average value of the control current over time. In this context, the effective value results from integration of the control signal over time, in particular from a root mean square over the period length. The threshold value can be defined below a limiting value for the maximum permissible temperature of the control unit and/or of the actuation unit. In particular, the threshold value is predefined or predetermined at a safety interval below the limiting value. The safety interval serves here to detect imminent overheating or that the limiting value is to be exceeded imminently and to prevent it. In other words, the method proposed here for controlling the clutch assembly, in particular the control unit and/or the actuation unit, ensures that the temperature of the control unit and/or of the actuation unit remains (just) below a permissible limiting value.

During the pulsation of the control current, the control unit and/or the actuation unit can generate a torque or actuating torque which is higher than a torque or actuating torque which would be reached with a constant control current (e.g., the effective value of the pulsed current), wherein the pulsed control current brings about practically the same heating or temperature of the electronic control unit and/or of the actuation unit as the constant control current. In other words, a higher torque can be generated by means of the pulsed control current, considered over a period length, than in the case of actuation with the effective value of the pulsed control current. This can be explained by the fact that a strong or high initial pulse (e.g., an upper current level) of the pulsed control current is suitable for quickly overcoming the friction of the system (e.g., clutch components), wherein the damping of the system has a smaller influence on the dynamics of the system. In contrast, the damping of the system assists (at least briefly) the maintenance of the torque even though the control current has already dropped to the lower current level.

The signal of the control current which oscillates between an upper value and a lower value during the pulsation can also be described in such a way that it includes intervals (e.g., periods) which each have two different phases. In the first phase (upper value) the control current is higher than a constant control current (effective value), with the result that an actuating force of the actuation unit, in particular a motor force of the electronic servomotor, overcomes system friction and the torque rises. The system friction relates here to the friction of the components of the clutch system. In the second phase (lower value), the control current is lower than a constant control current (effective value), with the result that the torque drops. The heating power is precisely as high over the interval (period length) as in the case of the constant control current (effective value).

According to one advantageous example in step c) a pulse width modulation (abbreviated as PWM) of the control current is carried out. The control current generally has a square-wave signal here and the pulses can repeat with a fixed fundamental frequency. In order to carry out the pulse width modulation, a current controller can be provided. For further basic explanation of pulse width modulation, reference is made to the below description of FIG. 4. Alternatively or additionally with respect to a pulse width modulation (controlled by means of a current controller), the pulsation of the control current can also be carried out by a current regulation. The current regulation can regulate the control current in accordance with a (predetermined) pulsed setpoint current profile here.

According to a further advantageous example it is proposed that a duty cycle of the pulse width modulation (PWM) of the control current is between 0.05 and 0.5. The duty cycle can be between 0.1 and 0.4 or even between 0.25 and 0.37. The duty cycle of the pulse width modulation results from the ratio between the switch-on time (first phase) and the period length of the pulsed signal. This also results in the effective value becoming higher as the duty cycle becomes higher.

According to a further advantageous example it is proposed that the pulsed control current oscillates between an upper current level (first phase) and a lower current level (second phase), wherein a ratio of the lower current level to the upper current level is between 0.25 and 0.8. This ratio can be between 0.5 and 0.79 or even between 0.65 and 0.78. From this ratio it is apparent that the lower current level is not zero i.e. is different from zero. By means of the ratios proposed here, it can advantageously be ensured that the lower current level is still high enough (in relation to the upper current level) to be able to maintain a sufficient pressing force which is applied to a multi-disc packet of the clutch assembly. The pulsation can be implemented by actuating different pulse width modulation duty cycles, or the setpoint current of a current regulation corresponds to a corresponding pulsed profile. For example, the upper current level can be in the range from 17 A to 28 A (amperes), and the lower current level can be in the range from 10 A to 16.5 A [amperes]. The upper current level can be present for a switch-on time of 10 ms to 30 ms (milliseconds), and the lower current level can be present for a time period of 30 ms to 60 ms.

In order to make the method proposed here as effective and efficient as possible, the following information can be taken into account. The upper current level (e.g., control current in the first phase) should be selected to be high enough that the actuation unit, in particular the electronic servomotor, accelerates quickly and clearly and quickly overcomes the system friction. The upper current level should be selected to be only so high that the electronic control unit and/or the actuation unit can also make it available. In the second phase, the electronic servomotor at first still has momentum in the direction of a relatively high torque. After this, the torque (i.e., actuating torque) decreases owing to damping properties or friction irregularities. The adaption of the durations of the first phase and second phase and of the current levels should always be carried out according to the condition that the limiting temperature is not exceeded at any time.

According to a further advantageous example it is proposed that in a step d) the pulsation of the control current is ended if the temperature of the electronic control unit and/or of the actuation unit again drops below the threshold value. After ending the pulsation, the control current generally returns to its (normal) binary mode of operation. Binary mode of operation means here that the control unit is either switched on or switched off, that is to say is either energized with a (e.g., constant) control current or not. This binary mode is departed from only temporarily, specifically in the pulsed phase of the operation. It is possible that the threshold value for the initiation of step c) is different from the threshold value for the execution of step d), in particular the threshold value for the execution of step d) can be a cooler temperature.

According to a further advantageous example it is proposed that a ratio of the effective value reduced in step c) to an output value of the control current is at most 0.85. This ratio can further be at most 0.7. The output value is understood here to be the value of the control current (plotted over time) before the start of the pulsation. The output value is generally virtually constant. The upper current level is particularly preferably lower than the output value of the control current.

According to a further advantageous example it is proposed that the pulsation of the control current is adapted continuously to determined (e.g., measured) state data of at least one clutch component and/or at least one drive train component. Basically, pulse width modulation can be carried out in a varying or variable fashion. For example, the duty cycle of a square-wave pulse can be modulated when there is a constant fundamental frequency. Accordingly, the pulse width modulation can be used, in particular thanks to its variability, to adapt the pulsation of the control current continuously to determined state data. For this purpose, at least one of the following variables can be changed as a function of the determined state data: upper current level, lower current level, effective value, duty cycle, switch-on time, switch-off time, period duration, fundamental frequency. The state data can be data that permits conclusions to be drawn about the present state of wear of a clutch component, in particular of the clutch actuator system and/or of the clutch discs. Alternatively or additionally, state data can also be determined or measured which permits conclusions to be drawn about operating-point-dependent properties of the clutch assembly. For example, the friction properties of the clutch discs can change as a function of the clutch component temperatures, in particular as a function of the disc temperatures.

According to a further aspect, a vehicle is proposed having a clutch assembly for variably distributing torque to different axles of the vehicle, wherein an electronic control unit, which is suitable and configured for carrying out the method proposed here is assigned to the clutch assembly. For this purpose, the electronic control unit can comprise a program-controlled microprocessor and an electronic memory in which a corresponding control program is stored.

The clutch assembly generally has a multi-disc clutch as well as at least one (externally controllable) actuation unit for activating or deactivating the transmission of torque. The actuation unit can comprise an electronic actuator, in particular an electronic servomotor. The multi-disc clutch generally comprises at least one compressible disc packet which can be compressed by means of the actuation unit in order to initiate a transmission of torque. The actuation unit is usually controlled by the electronic control unit, which correspondingly outputs electric control currents to the actuation unit via corresponding actuation lines.

The details, features and advantageous examples explained above in relation to the method can correspondingly also occur in the vehicle presented here, and vice versa. In this respect, reference is made to the entirety of the statements there relating to the more detailed characterization of the features.

According to a further aspect, a use of a pulsed current signal for avoiding overheating of an electronic control unit and/or of an electronic servomotor of an electromechanical clutch of a motor vehicle is also proposed. The pulsed current signal or the pulsation of the current signal can be generated here by pulse width modulation and/or by corresponding current regulation.

The details, features and advantageous examples which are explained above in relation to the method and/or the vehicle can correspondingly also occur in the use presented here, and vice versa. In this respect, reference is made to the entirety of the statements there relating to the more detailed characterization of the features.

The present subject matter is explained in more detail below with reference to the figures. It is to be noted that the disclosure is not intended to be restricted by the exemplary embodiments shown. In particular, unless explicitly stated otherwise, it is also possible to extract partial aspects of the contents explained in the figures and to combine them with other components and realizations from the present description.

DETAILED DESCRIPTION

Figure 1:
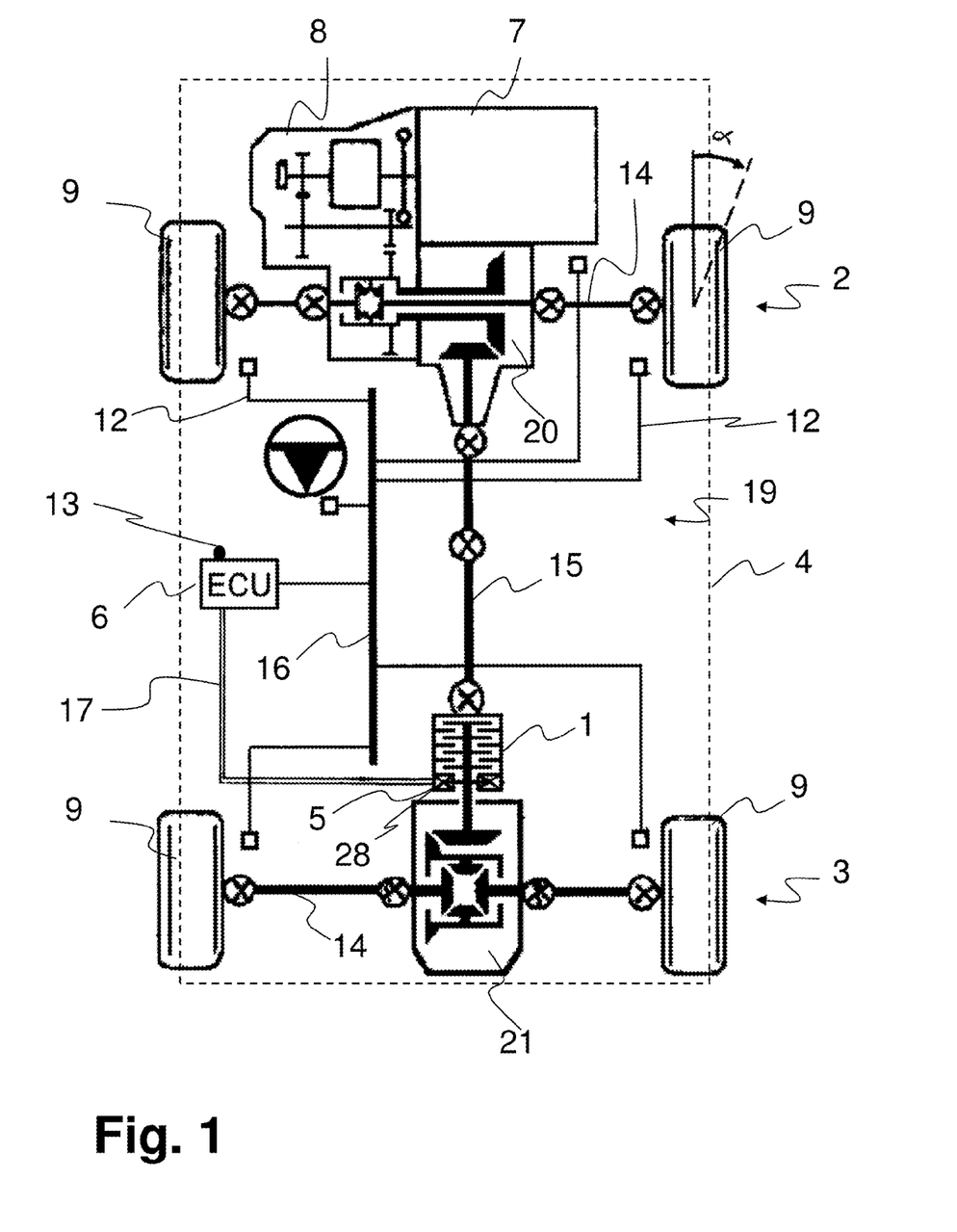
FIG. 1 shows an example vehicle having a clutch assembly for variably distributing torque to different axles of the vehicle, which clutch assembly is basically suitable and configured for carrying out the method explained here.

FIG. 1 shows a schematic view of the configuration of a vehicle 4, with respect to the components which are decisive for the operation of the drive train 19. The vehicle 4 has an engine 7 (operated with fuel and/or electrically) to which a gear transmission 8 is directly assigned. Arranged downstream of the gear transmission 8 is a distribution gear 20 which apportions the drive torque of the gear transmission 8 to a front primary axle 2 and a rear secondary axle 3 of the vehicle 4 with a predetermined symmetrical or asymmetrical ratio. The drive torque is therefore transmitted to the wheels 9 of the vehicle 4 via the side shafts 14 or the longitudinal shaft 15.

Furthermore, a clutch assembly 1 is provided which is connected upstream of, for example, a rear differential gear 21 and a multi-disc clutch, as well as externally controllable actuation units 5 for activation or deactivation. Of course, the clutch assembly 1 can also be arranged at another location within the drive train, for example at the front at the connection or integrated at the distribution gear 20. The actuation unit 5 is controlled by an electronic control unit 6 which correspondingly outputs electric control currents to the actuation unit 5 via corresponding actuation lines 17. For the electrical transmission of signals from and to the control unit or installation 6, a serial BUS arrangement 16 is provided which can be embodied, for example, as a CAN (controller area network) BUS. Interfaces, protocols and electrical circuit technology for the transmission of signals to a CAN BUS are known and do not have to be explained in more detail here. Of course, as an alternative to a BUS arrangement 16 it is also possible to provide individual wiring of the various electrical components of the vehicle to the control unit. The electronic control unit 6 comprises a program-controlled microprocessor and an electronic memory in which a control program is stored. In this context, the microprocessor generates corresponding control signals for the actuation unit 5 in accordance with a control program. In order to generate corresponding control signals, the control unit is dependent on information about various operating parameters of the vehicle. For this purpose, the control unit can access various signals, representative of these operating parameters, via the BUS arrangement 16. In particular wheel sensors are provided for (each) wheel and steering sensors are provided for detecting a steering angle of the vehicle and are connected (via signal conductors 12) to the control unit 6 via the BUS arrangement 16. For example, a temperature sensor 13 is mounted at the electronic control unit 6 (ECU). Said temperature sensor 13 can, of course, also be arranged in the control unit 6.

Figure 2:
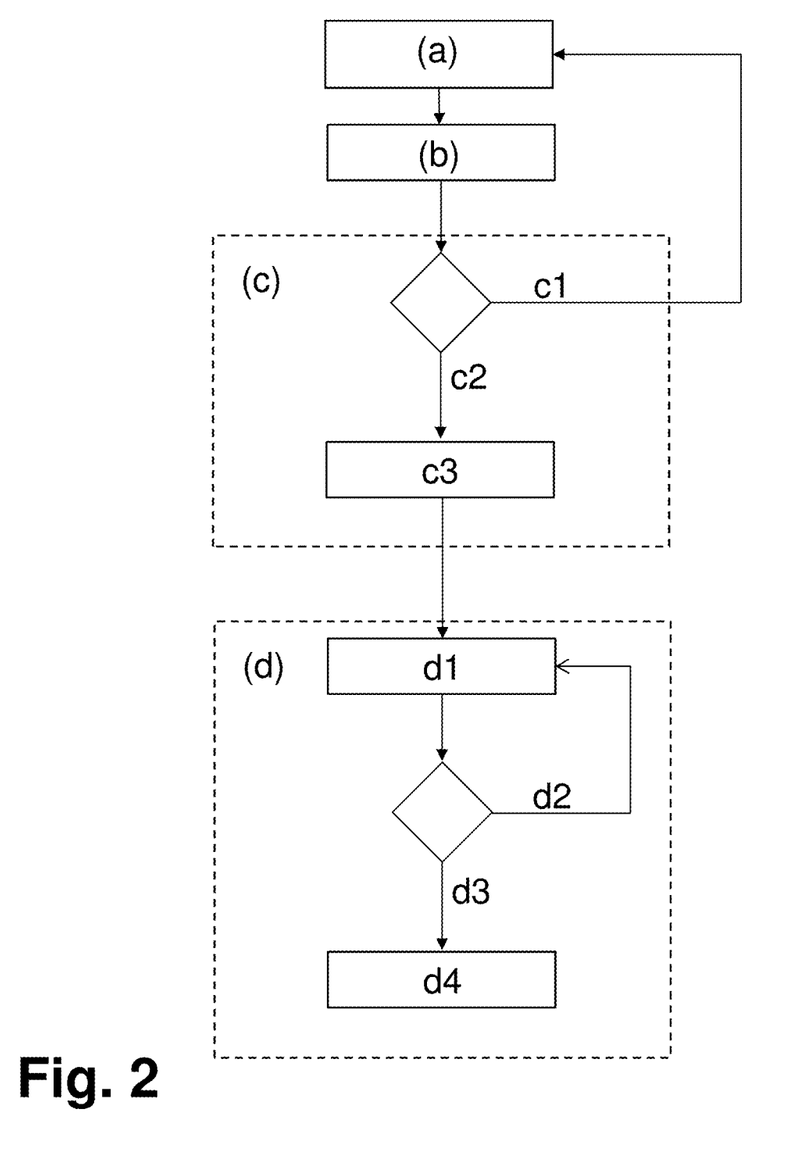
FIG. 2 shows a flowchart illustrating an example of the method.

FIG. 2 shows a schematic flowchart which illustrates an example of the disclosed method. The method starts in step (a) with a determining of temperature data of an electronic control unit 6 which is assigned to the clutch assembly 1. For example, the electronic control unit 6 includes a temperature sensor 13 with which a temperature 10 of the control unit 6 can be determined. In step (b), the temperature data of the electronic control unit 6 which is determined in step (a), here the temperature 10 measured by means of the temperature sensor 13, is evaluated.

In step (c) there is then what is referred to as an if-then differentiation. If the evaluation in step (b) reveals that a temperature 10 of the electronic control unit 6 exceeds a threshold value 24, the method is continued along the decision path c2. In a step c3, an effective value of a control current 11 of the electronic control unit 6 is then reduced by pulsing the control current 11. However, if the evaluation reveals that the temperature 10 does not exceed the threshold value 24, the method is continued along the decision path c1 and starts anew at step (a).

If a reduction in the effective value of the control current occurred beforehand in step (c), the method is continued here by way of example with a step (d). In a step d1, a renewed determining and evaluating of the temperature 10 of the electronic control unit 6 firstly takes place. An if-then differentiation then takes place again. If the temperature 10 of the electronic control unit 6 undershoots the threshold value 24 again, the method is continued along the decision path d3, wherein in a step d4 the pulsation of the control current 11 is ended again. However, if the temperature 10 remains above the threshold value 24, the method is continued here by way of example along the decision path d2 and repeated from the step d1. According to another example, the decision path d2 could also lead again to step (a) of the method.

Figure 3:
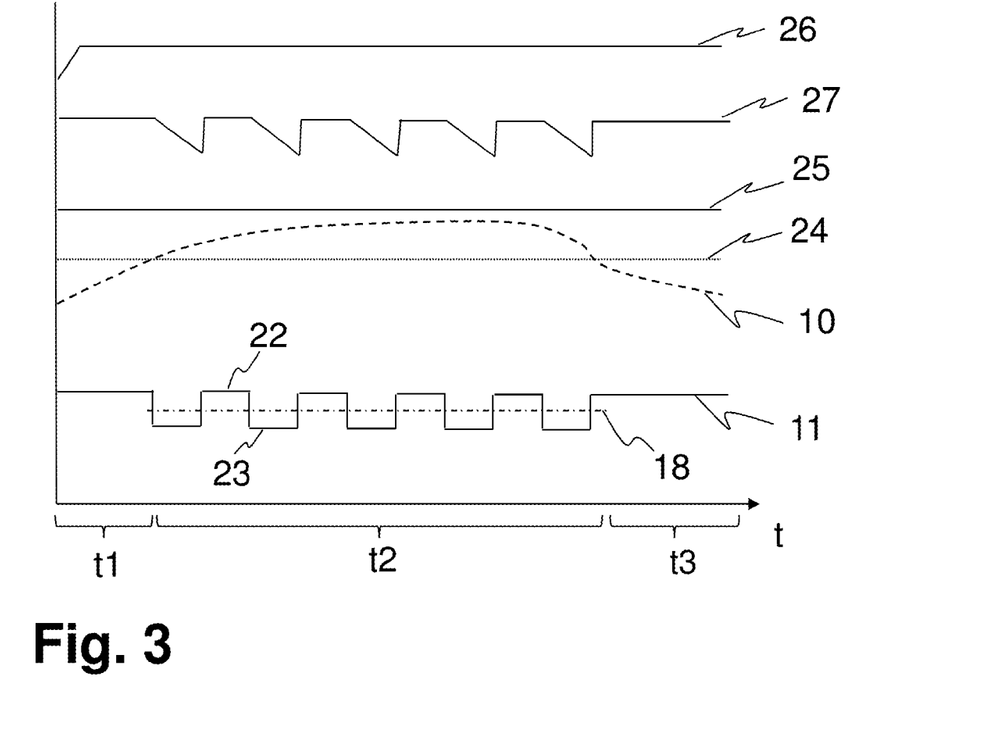
FIG. 3 shows time profiles of parameters during operation of a drive train.

FIG. 3 shows schematically, and for the purpose of further clarification of the method, time profiles of parameters during operation of the drive train 19. A control current 11, a temperature 10 of the electronic control unit 6, a torque 26 and a pressing force 27, which is applied to a disc packet of a clutch assembly 1, are shown plotted against the time t.

In order to avoid overheating or imminent overheating of the electronic control unit, a threshold value 24 and a limiting value 25 are provided or defined here. The limiting value 25 forms here an upper limit of the temperature 10 which must not be exceeded in order to avoid overheating. A threshold value 24 is defined at a safety interval below the limiting value 25. The threshold value 24 has here a warning function in order to avert imminent overheating.

If the temperature 10 exceeds the threshold value 24, the effective value 18 of the control current 11 is reduced by pulsing the control current 11. The pulsation is carried out here by means of pulse width modulation (PWM) of the control current 11. Accordingly, the current signal of the control current 11 has, during a time period t2, an upper current level and a lower current level 23 between which the current signal (e.g., square-wave signal) oscillates. For example, here the upper current level 22 and an output value of the control current 11 are approximately at the same current level before the reduction. The output value is the value of the control current 11 during the time period t1 and is virtually constant here. It is also apparent that, for example, the lower current level 23 does not here assume the value zero.

In FIG. 3 it is also shown that the control current 11 can return to its output value (see time period t3) if the temperature 10 drops below the threshold value 24 again and as a result the pulsation of the control current 11 is ended. A torque 26, which is transmitted by means of the clutch assembly 1, can, despite a control current 11 which is pulsed in the meantime (during the time period t2), be maintained at a virtually constant level here. A driver of the vehicle 4 is (almost) unaware of the overheating prevention measure, which is made available by means of the method proposed here. However, it is possible, for example, to output a corresponding warning signal to the driver during the time period t2 in order to alert him or her to the overheating prevention measure which has been implemented.

Furthermore, according to the illustration according to FIG. 3, the time profile of a pressing force 17 is shown, which pressing force 17 is applied to a disc packet of a clutch assembly 1 during the transmission of torque by means of the actuation unit 5. It is apparent that owing to the pulsed control current 11 the pressing force 17 decreases repeatedly during the brief reductions in the actual control current 11. However, the pulse width modulation, in particular the duty cycle and the upper current level 22, is configured here in such a way that the power made available by means of the control current 11 is sufficient to make available, even during the time period t2, a pressing force 17 which is high enough to compress the disc packet sufficiently.

Figure 4:
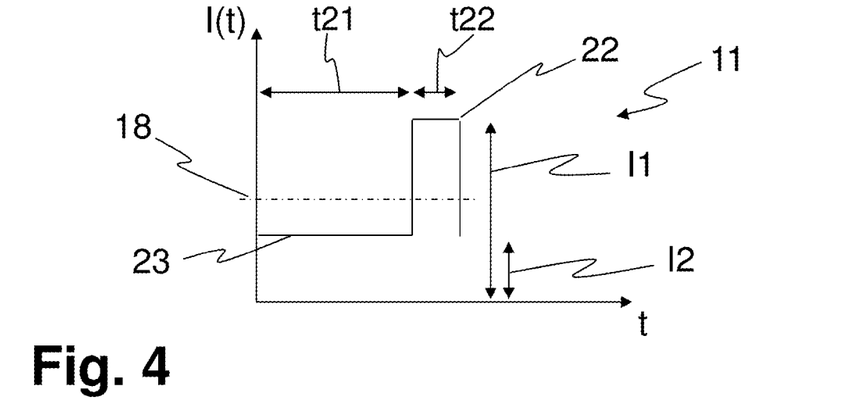
FIG. 4 is an illustration of a pulse-width-modulated signal.

FIG. 4 serves to provide a general illustration of a pulse-width-modulated signal, here a current signal I(t) of the control current 11. The current signal I(t) is plotted against the time t. The current signal I(t) has an upper current level 22 and a lower current level 23. The signal is a square-wave signal which oscillates between the upper current level 22 and the lower current level 23. It is also apparent, as illustrated above in respect to the pulsed control current 11, that the lower current level 23 does not drop to zero (that is to say I is unequal to "0"), which is, however, also not to be basically ruled out with the method disclosed herein. The upper current level 22 has an upper current strength I1 and the lower current level 23 has a lower current strength I2.

The effective value 18 relates to an average value of the control current 11 over time. In this context the effective value 18 results from integration of the current signal I(t) over time t. The time profile of the current signal is determined here by what is referred to as a switch-on time t22 and a switch-off time t21. Basically, in the case of pulse width modulation (PWM) the ratio between the switch-on time t22 and the period duration of the square-wave signal can be varied when the fundamental frequency is fixed. The period duration results here from the sum of switch-on time t22 and switch-off time t21. The ratio between the switch-on time t22 and the period duration (t22+t21) is referred to as a duty cycle. It results from this that the effective value 18 becomes higher as the duty cycle becomes higher and the upper current strength I1 becomes higher.

Figure 5:
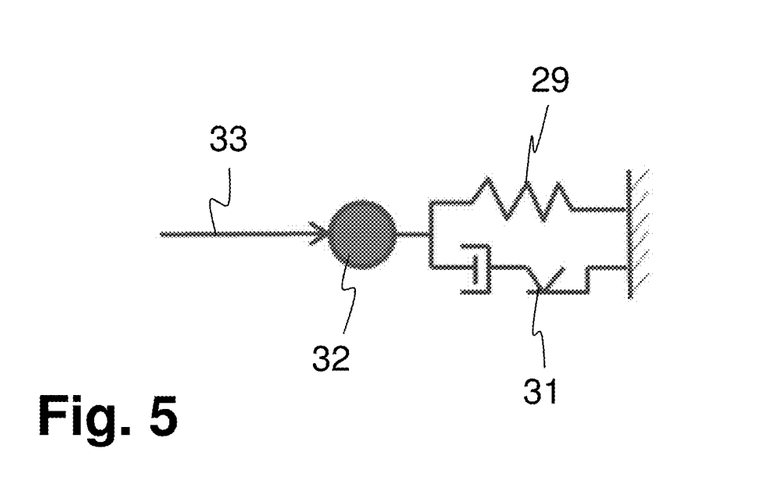
FIG. 5 shows a simplified mechanical analogous model illustrating the dynamic properties of the clutch assembly.

FIG. 5 is a schematic view of an example simplified mechanical analogous model illustrating the dynamic properties of the clutch assembly 1. The inertia of the system is decisively determined by the inertia of the actuation unit 5 (for example an electronic servomotor 28). The system also comprises further clutch components such as, for example, clutch discs, disc carriers or the like. The friction and damping properties of the system are illustrated alternately here by means of the spring 29, the damping 30, and the friction 31. The system mass is shown here as a mass 32. A force 33, which represents the actuating force owing to energization or actuation of the actuation unit 5, acts on the mass 32.

Figure 6:
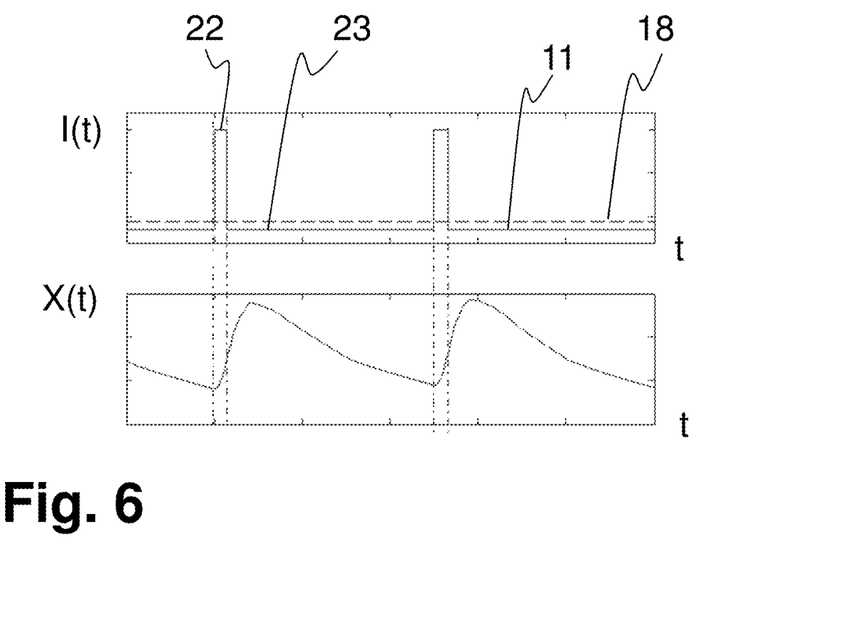
FIG. 6 shows further time profiles of parameters during operation of a drive train.

FIG. 6 is a schematic view of the profile of a pulsed current signal I(t) of the control current 11 over time t. The current signal I(t) has an upper current level 22 in a first phase and a lower current level 23 in a second phase. The signal is a square-wave signal which oscillates between the upper current level 22 and the lower current level 23. Effective value 18 is also plotted, as an average value of the current signal I(t) over time. Furthermore, FIG. 6 shows the time profile of an actuating position X(t) which can be predefined by means of the actuation unit 5. The dynamic behaviour of the system can be described in such a way that in the first phase the friction 31 is overcome clearly or quickly, with the result that the damping 30 has little influence. In the second phase, the damping 30 assists the maintenance of the spring force of the spring 29. It is therefore possible to ensure that, considered over the entire interval or the period duration, the spring force remains higher than that which would be achieved with a constant force with the same input of energy. Accordingly, the control unit 6 and/or the actuation unit 5 supply/supplies, during the pulsation of the control current 11, a torque or an actuating torque which is higher than a torque or actuating torque which would be obtained with a constant control current, wherein the pulsed control current 11 brings about (virtually) the same heating or temperature of the electronic control unit 6 and/or of the actuation unit 5 as the constant control current.

A method is disclosed herein which solves, at least partially, the problems which are described with reference to the prior art. The method makes available an overheating prevention measure which does not have an appreciable effect on the driving behaviour of the vehicle. The method also makes it possible to avoid, even in boundary situations, undesired overheating of the electronic control unit (ECU) and/or of the actuation unit without the driver noticing a reduction in performance.

The invention claimed is:

1. A method for operating a drive train of a vehicle having a clutch assembly, comprising:
   determining temperature data at least from one of an electronic control unit assigned to the clutch assembly and an actuation unit of the clutch assembly;
   evaluating the determined temperature data; and
   reducing an effective value of a control current of at least one of the electronic control unit and the actuation unit by pulsing the control current if the evaluation of the determined temperature data exceeds a specified threshold value.

2. The method of claim 1, wherein the temperature is determined with at least one temperature sensor assigned to the electronic control unit or the actuation unit.

3. The method of claim 1, wherein pulsing the control current includes carrying out a pulse width modulation (PWM) of the control current.

4. The method of claim 3, wherein a duty cycle of the pulse width modulation (PWM) of the control current is between 0.05 and 0.5.

5. The method of claim 1, wherein the pulsed control current oscillates between an upper current level and a lower current level, and wherein a ratio of the lower current level to the upper current level is between about 0.25 and 0.8.

6. The method of claim 1, further comprising ending the pulsation of the control current if a second determined temperature is below the threshold value.

7. The method of claim 1, wherein a ratio of the effective value to an output value of the control current is at most 0.85.

8. The method of claim 1, wherein the pulsation of the control current is adapted continuously to determined state data at least of one of at least one clutch component and at least one drive train component.

9. An electronic control unit for a clutch assembly in a vehicle, the electronic control unit comprising programming for:
- determining temperature data at least from one of an electronic control unit assigned to the clutch assembly and an actuation unit of the clutch assembly;
- evaluating the determined temperature data; and
- reducing an effective value of a control current of at least one of the electronic control unit and the actuation unit by pulsing the control current if the evaluation of the determined temperature data exceeds a specified threshold value.

10. The electronic control unit of claim 9, further comprising programming for receiving the determined temperature from at least one temperature sensor.

11. The electronic control unit of claim 9, wherein pulsing the control current includes carrying out a pulse width modulation (PWM) of the control current.

12. The electronic control unit of claim 11, wherein a duty cycle of the pulse width modulation (PWM) of the control current is between 0.05 and 0.5.

13. The electronic control unit of claim 9, wherein the pulsed control current oscillates between an upper current level and a lower current level, and wherein a ratio of the lower current level to the upper current level is between about 0.25 and 0.8.

14. The electronic control unit of claim 9, further comprising programming for ending the pulsation of the control current if a second determined temperature is below the threshold value.

15. The electronic control unit of claim 9, wherein a ratio of the effective value to an output value of the control current is at most 0.85.

16. The electronic control unit of claim 9, further comprising programming to continuously adapt the pulsation of the control current to determined state data at least of one of at least one clutch component and at least one drive train component.

17. A vehicle having a clutch assembly for variably distributing torque to different axles of the vehicle or for distributing torque between two wheels of one axle of the vehicle, comprising an electronic control unit configured for:
- determining temperature data at least from the electronic control unit, wherein the electronic control unit is assigned to the clutch assembly;
- evaluating the determined temperature data; and
- reducing an effective value of a control current of at least the electronic control unit by pulsing the control current if the evaluation of the determined temperature data exceeds a specified threshold value.

* * * * *